UNITED STATES PATENT OFFICE.

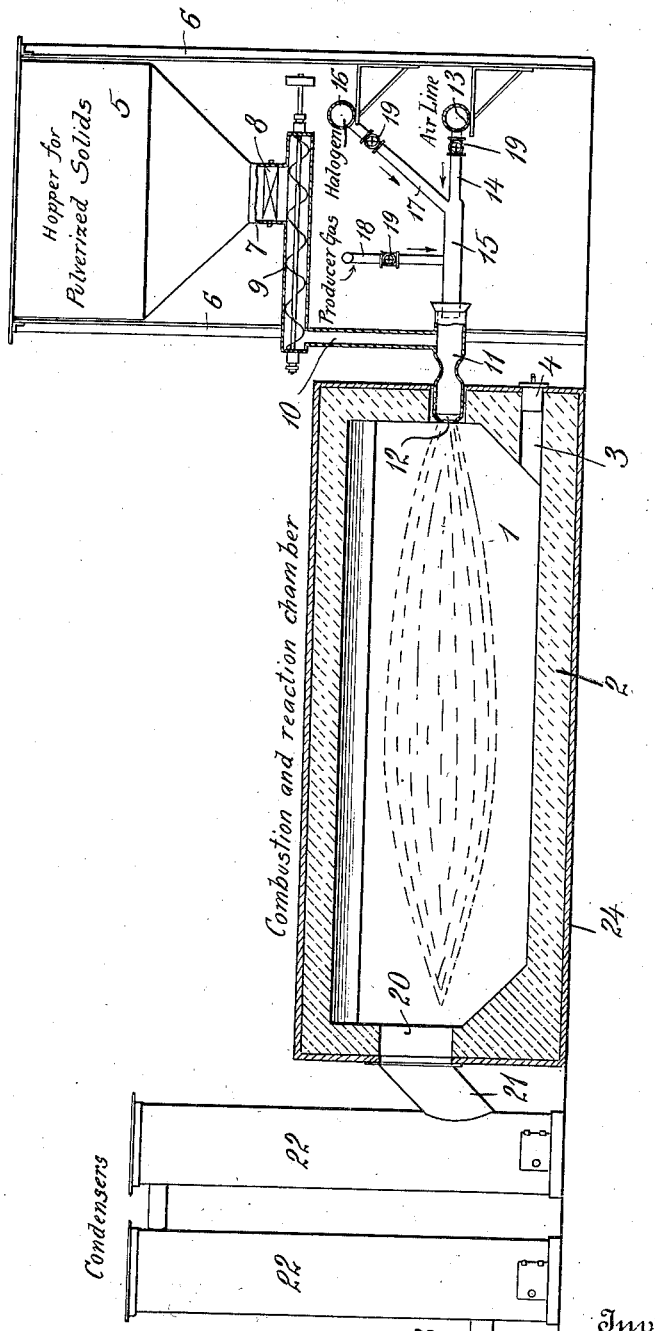

CLIVE MORRIS ALEXANDER, OF NEW YORK, N. Y.

PROCESS OF MAKING METALLIC HALIDS.

1,366,626.  Specification of Letters Patent.  Patented Jan. 25, 1921.

Application filed October 9, 1919. Serial No. 329,552.

*To all whom it may concern:*

Be it known that I, CLIVE M. ALEXANDER, a citizen of the United States, residing at New York city, in the county of New York, State of New York, have invented certain new and useful Improvements in Processes of Making Metallic Halids; and I do hereby declare the following to be a full, clear, and exact description of the invention, such as will enable others skilled in the art to which it appertains to make and use the same.

This invention relates to processes for making metallic halids, and comprises a method of making aluminum chlorid by the reaction between aluminous material, solid or gaseous carbonaceous fuel, and chlorin through injecting a mixture of pulverized solids and gases into a reaction chamber wherein the heat necessary to maintain the reaction mixture at the reaction temperature is supplied through the combustion of fuel and air intermingled and injected into the reaction chamber with the reaction mixture; and it also comprises a combination of apparatus elements, including a reaction chamber and means for mixing and injecting the reaction materials therein.

It is well known that aluminum chlorid is a very reactive chemical with many uses in the arts. At present, it is manufactured by passing chlorin gas over metallic aluminum or by passing chlorin over or through a mixture of aluminous material, such as bauxite, with carbon, the heat necessary for maintaining the reaction being supplied from the outside or through preheated gases passed through the reaction mixture. The former is uneconomical, owing to the high cost of aluminum, and the latter from wear and tear on apparatus or inefficiency of reaction.

In processes where inexpensive aluminous materials are used, the reaction between alumina, carbon, and chlorin, although slightly exothermic, requires additional heat to maintain it at the reaction temperature, above a bright red heat. In practice it has been difficult for an apparatus to withstand the high temperatures and the highly reactive gases, and to obtain efficient heating and efficient reaction owing to lack of intimate contact. Where the reaction mixture is charged into retorts externally heated, the refractory material from which the retort is made can not withstand the excessive heat on the outside required to maintain reaction temperature on the inside. The retort soon gives way or cracks, thereby resulting in loss of reacting materials. Where preheated gases are used in order to maintain the reaction temperature, it is necessary that the aluminous material and carbon be in the form of briquets to give a free passage for the gas. Fairly efficient heating is obtained by this means yet reaction with the chlorin can only take place on the surface of the lumps or briquets, thereby being quite inefficient, much chlorin escaping without reacting with the aluminous and cokey mass.

In the present invention, in case a solid fuel is used I intimately mix the reaction materials and the fuel without the reaction chamber, the solids being pulverized, and inject these by suitable means into the reaction chamber, the pulverized solids being suspended in the gases. The heat necessary to maintain the reaction temperature is obtained through the combustion of the fuel and air in the same zone and in intimate contact with the reaction materials. Very efficient heating is thereby obtained and the temperature and degree of combustion can be readily controlled. Since the heating is effected within the reaction chamber instantaneous heat transfer to the reacting materials is obtained and also the reaction chamber is not subjected to as high a temperature as is the case where heating is effected from the outside. Ordinary refractory materials are therefore capable of withstanding the temperatures involved and the reaction chamber can be made gas tight on the outside where it is comparatively cool.

It is evident that the heating is not only efficient and the wear and tear on the apparatus greatly reduced, but also that the reaction between the alumina, carbon, and chlorin is almost instantaneous, owing to the finely divided state of the solids suspended in the gases. The maximum amount of surface is thereby exposed to heating and to reaction. Since the reaction is almost instantaneous, due to the maximum surface exposed, the desired reaction is very complete within the reaction chamber and very efficient utilization of reaction materials is obtained.

In carrying out this process the reaction materials and fuel are previously dried to remove moisture and in the case where hydrated aluminous materials are used, they are kiln dried to remove combined water. The reaction materials may be mixed in proportion as shown by the following equation based on the constituents shown:

$$Al_2O_3 + 3C + 3Cl_2 \rightarrow Al_2Cl_6 + 3CO$$

However, the concentrations of alumina, carbon, and chlorin can be varied as desired.

To one pound of the solid reaction materials is added approximately one pound of fuel, such as coke or coal, and the total mix is then pulverized to 95% through 100 mesh and 85% through 200 mesh. The average pulverized solid mix is approximately 500 mesh. This highly puverized solid is then conveyed to a mixing device or twyer wherein the pulverized solids are mixed with the desired proportion of chlorin and air and continuously blown into the reaction chamber.

Prior to adding the reaction mixture the reaction chamber is first heated up to the desired reaction temperature 1600° to 2000° F. by injecting pulverized fuel and air. The reaction temperature once attained is maintained through injecting the heating materials, pulverized carbon and air in the required quantities along with the reaction materials, alumina, carbon and chlorin. The temperature can thereby be readily maintained and the reaction most efficiently controlled and carried out in what may be termed the vapor state, since the solids are suspended and so finely pulverized that they act very much like a true vapor. The products from the reaction chamber are conducted through condensing apparatus wherein the aluminum chlorid is collected.

Where a more complex aluminous material than bauxite, such as feldspar (orthoclase) $KAlSi_3O_8$ is used, the quantity of chlorin added to the reaction mixture can be readily adjusted so that only the potassium and aluminum are chlorinated. This affords not only a means for making aluminum chlorid but also a source for potash, as potassium chlorid. By using a somewhat higher temperature and more chlorin silicon tetrachlorid can also be obtained.

When coke is used as the reducing and heating material, it is best to add a little producer gas with the reaction mixture, in order to obtain uniform ignition throughout the mass. With coals containing 10% or more volatile matter, this is not necessary. Producer gas or carbon monoxide can be substituted for the coke or coal either as the reducing or heating material or both. In case such a gaseous fuel is used, the aluminous material need not be mixed with pulverized coal or coke, but it is simply injected into the combustion and reaction chamber by means of a blast of the gaseous fuel, a blast of air or a blast formed of a mixture of the two. Accordingly where the word "fuel" is used in the claims without further qualification, it should be understood to cover a finely divided fuel, such as pulverized coal or coke, as well as the above mentioned substitutes, producer gas or carbon monoxid.

It is not necessary to utilize chlorin gas but chlorin containing gases can be used with good results. Carbonyl chlorid (phosgene) or carbon tetrachlorid work very well.

The above described process may be carried out in an apparatus such as shown on the drawing, which is purely diagrammatic. In this drawing, 1 indicates a combustion and reaction chamber, incased gas tight by the steel shell 24, the walls 2 of which are made of any desired refractory material that will withstand the high reaction temperature, or it may be made of other material and lined with a refractory lining. A passage 3 provided with a closure 4 may be provided for cleaning, or for removing slag, etc.

5 indicates a hopper supported on the standard 6 and provided with a discharge opening 7 controlled by a gate 8. The discharge opening 7 opens into the passage of a screw conveyer 9 which, at its other end, delivers the material to a vertical passage 10 that opens into a mixing chamber 11.

The mixing chamber 11 is provided with a discharge nozzle 12 opening into the reaction chamber 1.

The hopper 5 is filled with finely divided metal bearing material, and in case aluminum chlorid is being manufactured, with finely divided bauxite. This finely divided metal bearing material is intimately mixed with a finely divided fuel, such as powdered coal or powdered coke. The average pulverized solid mix is approximately 500 mesh.

13 indicates an air reservoir which through pipes 14 and 15 lead the air to the mixing chamber 11. 16 indicates a reservoir for a halogen, such as chlorin, bromin, or iodin, preferably in the gaseous form, which through pipes 17 and 15 deliver it to the mixing chamber 11.

18 indicates a pipe opening into the pipe 15 for leading in producer gas, in case it is desired to use the same. 19 indicates controlling valves.

The screw conveyer 9 is operated in any desired manner and carries the pulverized solids to the passage 10 where the blast of mixed air and halogen blows them into the mixing chamber 11 and thence into the combustion chamber 1. Suitable amounts of producer gas may be introduced into the mixture to maintain ignition, especially if coke is used as a fuel.

The above described solids and gases, due to the pulverized form of the solids and the agitation caused by the injection into the chamber, are kept in intimate contact, whereby the chemical reaction is quick and complete and whereby the burning of the fuel is very rapid and the temperature for the reaction thereby maintained.

While the several constituents of the reaction are indicated as being injected simultaneously, it is within the scope of the invention to inject the heating materials and the reaction mixture alternately. The heat during the blow being stored up in the refractory materials of the reaction chamber; this heat being absorbed therefrom during the make.

Furthermore, separate injecting means could be used for the several constituents, that is to say, the air might be used to inject the pulverized solids and the halogen gases injected separately. The producer gases could also be injected separately, if desired.

In another aspect, the chlorin or other halogen could be injected into the reaction chamber at a stage following the primary combustion of the fuel.

The products of the reaction are fed through a suitable opening 20 in the reaction chamber by a pipe 21 to one or more condensers 22 in which the metallic halid condenses. The gaseous products of combustion escape through the pipe 23.

In another aspect, one of the pulverized solids could be injected by the air, and the other by the gaseous halogen, through separate injectors. In other words, the invention is not limited to mixing the pulverized solids, air and gaseous halogen all together and injecting them through a single injector.

The above apparatus, it should be understood, is only illustrative, inasmuch as the invention may be carried out in many other ways than with the apparatus shown.

I claim as my invention:

1. The process of making metallic halids, comprising injecting a pulverized metal-bearing material, fuel, a gas to support combustion, and a halogen, into a combustion and reaction chamber.

2. The process of making metallic halids, comprising pulverizing a metal-bearing material and injecting it into a combustion and reaction chamber where it contacts with fuel, with a gas to support combustion, and with a halogen.

3. The process of making metallic halids, comprising pulverizing a metal-bearing material and blowing it into a hot combustion and reaction chamber simultaneously with the injection into said chamber of fuel, air and a halogen.

4. The process of making metallic halids, comprising injecting a finely divided metal-bearing material and fuel into a combustion and reaction chamber by a blast of a combustion-supporting gas, and also injecting a halogen into said chamber.

5. The process of making metallic halids, comprising injecting a finely divided metal-bearing material and fuel into a combustion and reaction chamber where it contacts with a gaseous halogen, and also injecting a combustion supporting gas into said chamber.

6. The process of making metallic halids, comprising injecting a finely divided metal-bearing material and fuel into a reaction chamber by a blast of a mixture of a combustion supporting gas and a gaseous halogen.

7. The process of making metallic halids, comprising mixing a pulverized metal-bearing material with pulverized coal and injecting the mixture into a reaction chamber by means of a blast of air and a gaseous halogen.

8. The process of making aluminum chlorid, comprising injecting a finely divided aluminum-bearing material, fuel, air and chlorin, into a combustion and reaction chamber.

9. The process of making aluminum chlorid, comprising injecting finely divided aluminum-bearing material into a combustion and reaction chamber by means of a blast of air, and also injecting fuel and chlorin into said chamber.

10. The process of making aluminum chlorid, comprising injecting finely divided aluminum-bearing material and fuel and chlorin, into a combustion and reaction chamber by means of a blast of air.

11. The process of making metallic halids, comprising injecting pulverized coal and bauxite into a combustion and reaction chamber, by means of a blast of air and gaseous halogen.

12. The process of making metallic halids, comprising injecting a finely-divided metal-bearing material, a finely-divided solid fuel, a gaseous fuel, a gas to support combustion, and a halogen, into a combustion and reaction chamber.

13. The process of making metallic halids, comprising injecting a finely-divided metal-bearing material, finely-divided carbonaceous fuel, producer gas, air, and a halogen, into a combustion and reaction chamber.

14. The process of making metallic halids, comprising injecting fuel and a gas to support combustion into a chamber to preheat it, then injecting finely-divided metal-bearing material and a halogen, into said chamber.

15. The process of making metallic halids, comprising injecting fuel and a gas to support combustion into a chamber to preheat it, then injecting finely-divided metal-bearing material, fuel, a gas to support combustion and a halogen, into said chamber.

In testimony whereof I affix my signature.

CLIVE MORRIS ALEXANDER.